April 1, 1969          H. C. HALLER          3,436,041
SEAM CONSTRUCTION WITH HEAT SHRINKABLE LOOP ELEMENTS
Filed March 31, 1967
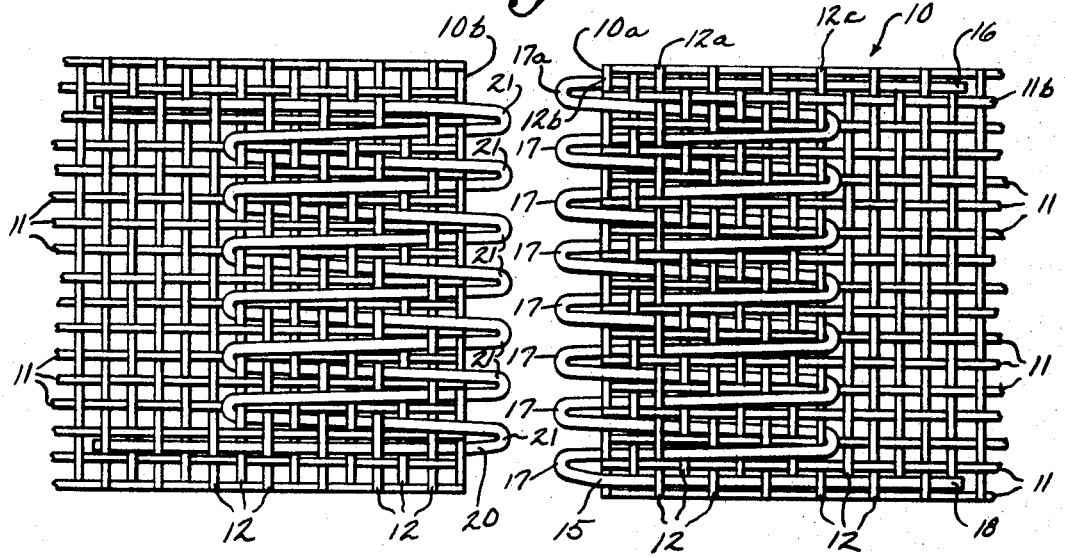
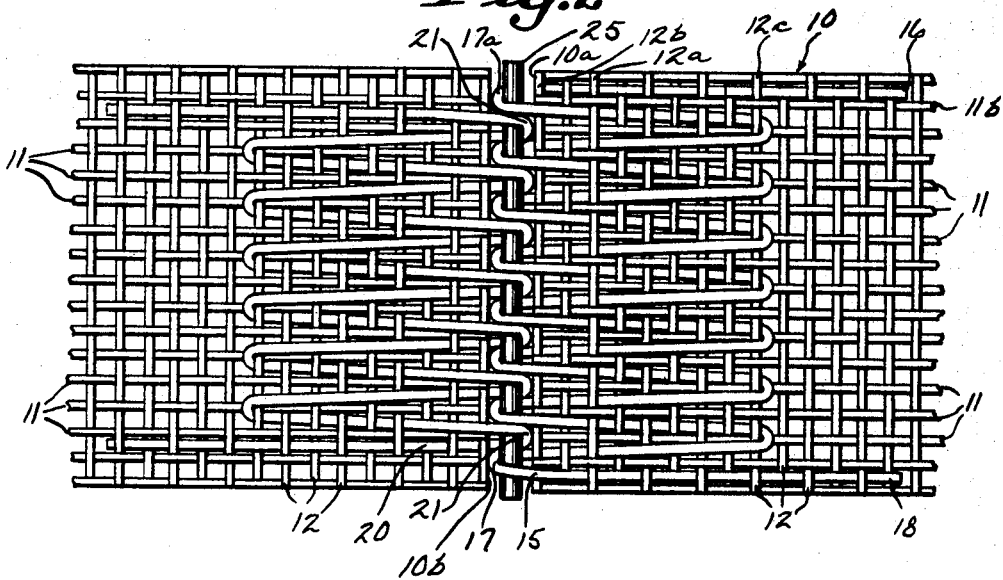
INVENTOR
HERBERT C. HALLER
ATTORNEY

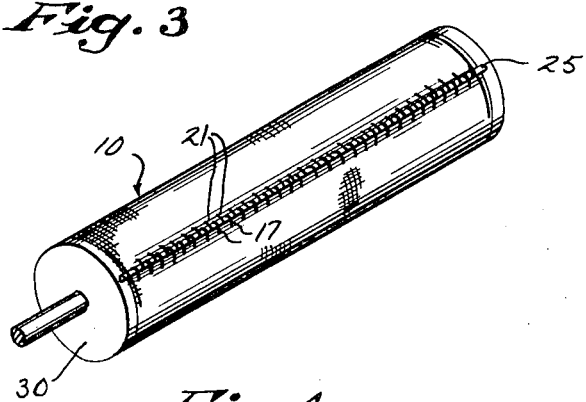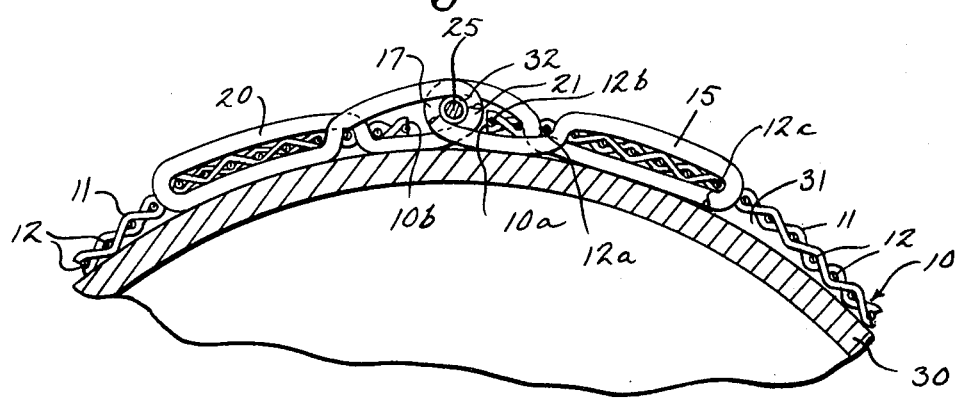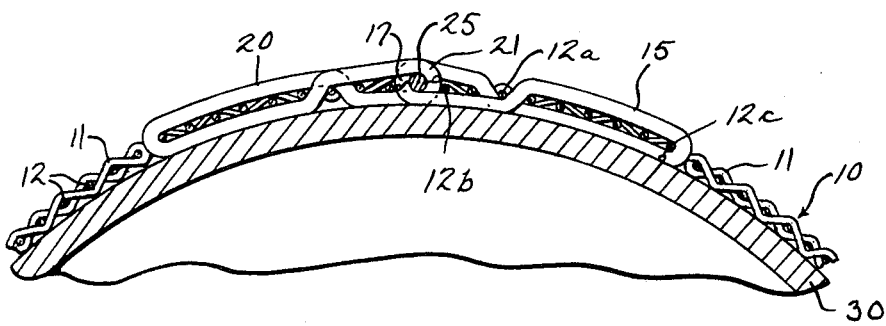

United States Patent Office 3,436,041
Patented Apr. 1, 1969

3,436,041
SEAM CONSTRUCTION WITH HEAT SHRINKABLE LOOP ELEMENTS
Herbert C. Haller, Appleton, Wis., assignor to Appleton Wire Works Corp., Appleton, Wis., a corporation of Wisconsin
Filed Mar. 31, 1967, Ser. No. 627,389
Int. Cl. B21f 27/08, 27/14
U.S. Cl. 245—10                         4 Claims

ABSTRACT OF THE DISCLOSURE

A seam construction for joining together adjacent ends of a woven wire belt, or similar item, in which each end has a heat shrinkable plastic thread member laced thereabout to form projecting loops which are enmeshed or interleaved with a connecting pin member inserted through the loops, after which the looped filaments are heat shrunk to tighten the seam and enable the belt to be closely applied about an object.

Background of the invention

*Field.*—This invention relates to so-called "pin seams" for joining together adjacent ends of a belt or other suitable member to be seamed together.

*Description of the prior art.*—What is referred to as the "pin seam" is a known construction often used for joining together the ends of a wire cover on a cylinder and comprises loops projecting from each end of the belt which are to be connected together and a pin member inserted between the intermeshed loops. U.S. Patent No. 1,807,628 shows this type of seam construction for joining a woven wire belt into an endless loop. In the patent, the two ends of the belt are brought alongside the seam area and a metal wire is fixed around each end of the belt so as to have loops projecting beyond the belt ends. These loops are then interleaved and connected about a pin member inserted therethrough. This type of seam for joining together opposite ends of a conveyor belt is also shown in 1,828,304. However the prior art versions of this type of seam have disadvantages. If the belt is to be used as a cover for a member such as a cylinder, it is very difficult to obtain a smooth tight fit of the cover around the cylinder because the members forming the loops at each end of the belt, as illustrated in the above patents, are of metal wire. The cover must usually be first tightened and then the pin inserted after the loops are intermeshed. Thus it requires considerable preparation and skill, oftentimes involving special tools or extensive training, in order to obtain a tight fit with the known forms of pin seam constructions.

Summary

This invention, in distinction to prior art pin seam teachings, employs loops at the two edges of the belt which are to be joined together which are made of heat shrinkable plastic thread members. When each end of the belt is provided with the projecting loops of the plastic thread members, and the loops at the two ends are intermeshed and a pin inserted through them, the seam area is heated so as to cause the plastic elements to shrink. Where the belt is used as a cover for a cylinder, for example, the cover then becomes tightened due to the shrink forces pulling the cover together. The finished product has a seam area which is so tight, subsequent to heat shrinking, that it is impossible to withdraw the pin. Nevertheless, before the heat treatment takes place, it is easy to feed the pin through the interleaved loops. By this construction, no special tools or training are required in order to obtain a smooth, tight and even fit of the wire belt about the cylinder or such other object to which it may be applied.

The principal objects of this invention are to provide a pin seam construction for joining the ends of a belt together which undergoes a size reduction as its final step so that the belt can thereby be tightly drawn together to cover an object snugly or be fit in a desired position. Another main object is to employ a pin seam construction haivng monofilament thread elements looped around each end or edge of a belt to be joined together, in which the thread elements are formed of heat shrinkable plastic monofilament materials. A more specific object is to provide the particular details of construction and/or method hereafter claimed.

Drawings

The description of this invention is made with reference to the accompanying drawings in which FIG. 1 is a top view of two ends of a woven wire belt incorporating a seam construction according to this invention, FIG. 2 is a top view showing the seam of FIG. 1 with a pin inserted between intermeshed loops, FIG. 3 is a perspective view of the woven wire belt applied as a cover over a cylinder, FIG. 4 is an enlarged transverse sectional view of the covered cylinder of FIG. 3 showing the seam area before it is heat shrunk and before the woven wire belt is tightly drawn over the cylinder, and FIG. 5 is a subsequent view the same as FIG. 4 but showing the seam after it has been heat shrunk so that the wire belt lightly covers the cylinder.

Description of the preferred embodiment

The following description shows, for the purposes of illustration, a presently-preferred mode for the practice of this invention and discloses a number of suitable materials for its construction. It should be understood, however, that other embodiments of the invention may be devised and that changes may be made in the described embodiment without departing from the true scope of the present invention.

FIG. 1

A wire belt 10 is shown that is formed from spaced warp wires 11 interwoven with spaced weft or shute wires 12 in any desired pattern, the one being a weave in which each weft wire passes over one warp wire and then under the next in a repeated pattern. The belt 10 is to be formed into an endless loop along its adjacent ends 10a and 10b by the seam construction next described.

A thread element 15 is woven into the wire cloth 10 along the end 10a in the manner shown in FIG. 1. The end 16 of the thread element 15 is started back a number of openings away from the end 10a of the cloth, and the thread is woven through openings in the cloth until it passes under the third weft wire 12a, from the end of the belt, after which it is looped around the remaining wires to form a loop 17 projecting beyond the end weft wire 12b. On the return arm of the first loop 17a, the thread 15 again is threaded under weft 12a but along the second warp 11b after which it is passed around the ninth weft 12c from the end of the cloth, thus forming a second loop extending around the wefts 12a and 12c. The interweaving of the thread element 15 with the belt 10 is continued in the same pattern to form a succession of loops 17 along the end of the belt, with the thread element 15 preferably extending back into the fabric over a plurality of weft wires 12 as each loop is formed, all in the manner shown in the drawings. The end 18 of the thread 15 may then be woven through a greater number of openings back from the end of the belt while remaining parallel to the edge warp wire. The series of loops 17 which are thusly formed are generally parallel to but spaced from each other. The other end 10b of the belt has a thread element 20 woven into it in the same fashion as the thread element 15 to form a series of spaced, parallel loops 21 along the end 10b of the belt.

The thread elements 15 and 20 may be applied to the wire cloth 10 in the following manner. The ends of the wire 10 are first cut square to insure an even match when they are brought together for assembly along the seam. The thread elements 15 and 20 are of a suitable diameter to enable them to fit through the openings in the wire cloth without forcing tight passage. The starting end of a thread element is inserted about three to five openings back from the end in such a way as to weave the thread in and out of the mesh, keeping the lacing parallel to the adjacent warp wire. After the first lacing at the starting edge is firmly embedded, a looping pin of suitable diameter is temporarily clamped along the end of the wire at which the loops are to be formed. The first loop then is formed by taking the long filament end of the thread element, passing it around the looping pin, and then taking the free end up through the next row of openings in the cloth to weave it back a few openings from the end. The looping is continued by spirally forming continuing loops across the end of the fabric. The spacings may be wider or narrower in a given loop pattern, which can be accomplished by skipping openings at regular intervals. The number of loops per inch of cloth can vary widely, usually ranging from 8 to 50 or more. After the looping has been completed, the looping pin is withdrawn. Usually, a looping pin of the length shorter than the actual width of the fabric to be joined is used and progressively moved along the edge of the mesh at which the loops are to be formed.

The nub of the present invention is to use the proper material for the thread elements 15 and 20; namely, to accomplish the purposes of this invention, the looped thread elements are to be made out of heat shrinkabel, synthetic plastic polymeric material. Preferably, these are in the form of monofilaments. A number of known plastic monofilaments are suitable for use as the thread elements, of which the following are given as examples:

| Example | Material | Tensile strength (p.s.i.) | Moisture absorption (percent) |
| --- | --- | --- | --- |
| (1) | Polyester filament | 60–150,000 | 0.2–0.5 |
| (2) | Polyethylene filament | 25–80,000 | 0.0 |
| (3) | Polypropylene filament | 40–90,000 | 0.0–0.1 |
| (4) | Polyamide filament | 58–134,000 | 3.0–5.0 |
| (5) | Acrylic filament | 30–40,000 | 1.0–2.0 |
| (6) | Modacrylic filament | 30–50,000 | 0.4–4.0 |
| (7) | Polyvinylidene chloride filament. | 25–60,000 | 0.0–0.1 |

The selection of a material for an application is generally based upon the particular requirements as to abrasion resistance, resistance to chemical attack, and tensile strength. If a wet end application is under consideration, that is, where the wires are exposed to fiber slurry as in papermaking or other high moisture environments, the more hydrophobic type of monofilament is best so that the filament will not "grow" with water and thereby cause loosening of the cover; for this type of application polyester filament (polyethylene terephthalate in Example 1), polyethylene or polypropylene (Examples 1.3) are the best of the listed choices since they will absorb less than 1% water. If moisture absorption is not a problem, the polyamide filament of Example 4 gives satisfactory results. The acrylic, modacrylic and polyvinylidene chloride monofilaments also are quite hydrophobic and can be used in wet atmospheres, but they do not have as high tensile strength as the first four monofilaments listed in the table and may tend to stretch when submitted to sustained loading; hence their use will depend upon the nature of the loads involved in the particular application under consideration.

FIG. 2

This drawing shows an intermediate stage in the formation of a seam using the belt 10 of FIG. 1. The loops 17 formed of the thread element 15 attached to the end 10a of the belt are interleaved or intermeshed with the loops 21 formed of the thread element 20 secured to the end 10b of the fabric. With the loops thusly intermeshed, a metal pin 25 is inserted so that it passes through each loop 17 and 21. This is the pin seam type of construction. The seam is now ready for the final step, namely being subjected to heat so as to cause the heat shrinkable members 15 and 20 to shrink and draw the seam together snugly and tightly; this is described in reference with the following drawings.

FIGS. 3–5

In FIG. 3 the belt 10 is shown as forming the cover for a vacuum cylinder 30. When the belt 10 is in place about the periphery of the cylinder, the two ends of the belt are brought alongside each other and the loops 17 and 21 intermeshed as related above, following which the pin 25 is inserted through each loop. In this condition, the belt 10 loosely conforms to the exterior of the cylinder 30, which is illustrated in FIG. 4. There may be a space at 31 between the belt 10 and cylinder 30 and there may be a slight space as indicated at 32 between the pin 25 and the loops 17 and 21. However, this loosely-fitting condition should not be a sloppy condition but may be one which can be obtained conveniently by hand arrangement of the belt 10 about the cylinder. One of the marked advantages of this invention is that the belt 10 does not have to be placed tightly around the cylinder at this stage of its assembly.

After the pin has been positioned between the intermeshed loops, the seam is ready for its final treatment in which the heat is applied over the thread elements 15 and 20. The heat may be supplied by infrared lamps, although other heat sources including a stream of hot air may be utilized. When subjected to the influence of heat, because of their material, the elements 15 and 20 shrink and draw the ends of the cover towards one another and thereby cause the cover to tightly fit about the surface of the cylinder 30, which condition is illustrated in FIG. 5. It will be further noted that the elements 15 and 20 also are more snugly drawn into place and fit tightly about the pin 25 inserted between their respective loops. Spaces such as 31 and 32 of FIG. 4 have disappeared after this heat treatment. In this condition, the finished seam can be so tight that it is not possible to withdraw the pin.

Although the present seam construction has been illustrated in the foregoing drawings and described with reference to a woven wire belt, it may be used for joining other types of members. For example, a solid sheet such as plastic sheeting or metal foil may be joined together in a similar manner; when a solid sheet is used, holes may be punched along the edges where the seam is to be formed and the heat shrinkable plastic thread element can be threaded through the punched holes in order to form the loops. Woven fabrics of yarns or plastic threads or monofilaments can also be used for the belts or members to be joined together by the present seam construction.

A typical use of belts joined with the seam construction of this invention is a vacuum cylinder in which the woven wire forms a mesh cover. The cylinder is hollow and suction created through the screen causes wet or loose dry fibers to be pulled against the rotating screen, after which the formed fibers are doctored off continuously and further processed as may be desired. The belt also may be applied as a cover over an object other than a cylinder, and, for example, can be installed in position over a pair of spaced rollers or rotating cylinders and then tightened by means of the present seam constructions.

It has been mentioned previously that changes in the described embodiment may be made and still remain within the conceptual scope of the present invention. The heat shrinkable plastic thread elements may be woven through the cloth in a manner different than illustrated and still form the desired projecting loops for the seam construction. Although a belt has been illustrated herein with heat shrinkable loop elements at each of its ends, it may be possible to use a heat shrinkable loop element along one end but nonheat shrinkable (such as a metallic, looped element), along the adjacent end; when heat is applied, the plastic element will shrink to tighten up the seam. It is to be understood that it is intended to cover all changes and modifications of the example of this invention herein illustrated, and other embodiments not shown, which do not constitute a departure from the true spirit and scope of this invention.

I claim:

1. In a seam construction joining together adjacent ends of a belt in which each belt end has a thread member attached thereto, each thread member has loops which project beyond its respective belt and, the loops are interleaved and a pin member inserted therethrough, the improvement wherein:

each thread member is of heat shrinkable plastic polymeric material, and the seam construction may be drawn tight upon the application of heat to the thread members to shrink them to fit tightly about the pin member.

2. A seam construction according to claim 1 wherein: the thread members are of a heat shrinkable plastic polymeric material selected from the group consisting of polyester filaments, polyethylene filaments, polypropylene filaments, polyamide filaments, acrylic filaments, modacrylic filaments, and polyvinylidene chloride filaments.

3. A seam construction according to claim 2 wherein: the belt comprises a plurality of spaced parallel warp wires and spaced parallel weft wires woven together to form a cloth of open mesh having a first wire along the end at which the seam is to be formed, another wire spaced therefrom and a third wire spaced from the second wire, with intervening parallel wires between the first and second and second and third wires, and each thread member attached to the belt has a loop portion extending across the first and second wires and projecting beyond the first wire, and a second loop portion extending around the second and third wires.

4. In a seam construction joining together adjacent ends of a belt in which each belt end has a thread member attached thereto, each thread member has loops which project beyond its respective belt end, the loops are interleaved and a pin member inserted therethrough, the improvement wherein:

one of the thread members is of heat shrinkable plastic polymeric material, and the seam construction may be drawn tight upon the application of heat to such thread member to shrink it to fit tightly about the pin member.

References Cited

UNITED STATES PATENTS

| | | | |
|---|---|---|---|
| 1,311,927 | 8/1919 | Trotman | 245—10 |
| 3,316,599 | 5/1967 | Wagner | 24—31 |

RICHARD J. HERBST, *Primary Examiner.*

U.S. Cl. X.R.

264—230, 249; 29—447, 148.4; 24—34